United States Patent [19]

Whiteside et al.

[11] Patent Number: 4,942,593
[45] Date of Patent: Jul. 17, 1990

[54] TELECOMMUNICATIONS INTERFACE WITH IMPROVED JITTER REPORTING

[75] Inventors: Frank A. Whiteside, Coppell; Michael D. Smith, Lewisville, both of Tex.

[73] Assignee: Dallas Semiconductor Corporation, Dallas, Tex.

[21] Appl. No.: 324,153

[22] Filed: Mar. 16, 1989

[51] Int. Cl.⁵ .......................................... H04L 7/027
[52] U.S. Cl. .................................... 375/118; 328/162
[58] Field of Search ............... 375/118; 370/100, 102, 370/108; 328/162; 307/269

[56] References Cited

U.S. PATENT DOCUMENTS

| 3,928,726 | 12/1975 | Colton et al. | 375/105 |
| 4,374,438 | 2/1983 | Crowley | 375/120 |
| 4,429,386 | 1/1984 | Graden | 375/118 |
| 4,434,498 | 2/1984 | Mathieu | 375/118 |
| 4,811,340 | 3/1989 | McEachern et al. | 476/118 |

Primary Examiner—Benedict V. Safourek
Assistant Examiner—Tesfaldet Bocure
Attorney, Agent, or Firm—Worsham, Forsythe, Sampels & Wooldridge

[57] ABSTRACT

A communications receiver, wherein an elastic store FIFO buffers clock-phase jitter. A jitter estimate is obtained by a very simple circuit, wherein the read clock is used as a reference to sample the FIFO address pointers.

49 Claims, 5 Drawing Sheets

TELECOMMUNICATIONS INTERFACE WITH IMPROVED JITTER REPORTING

BACKGROUND AND SUMMARY OF THE INVENTION

The present invention relates to communications systems, and particularly to communications systems where the data is synchronously formatted in frames.

Many very widely-used communications protocols require the data to be synchronously formatted in frames. Two very important protocols of this type are the "T1" standard, which is the first-level standard high-speed data interface to the telephone network in the United States and Canada, and CEPT, which is the comparable standard in Europe. Receivers for communications of this type must be able to extract the timing from the incoming signal, so that the incoming data is correctly sampled. Sampling with improper timing can lead to data errors.

T1 is an alternate-mark-inversion (AMI) format, where each "1" data bit is represented by a pulse, and a "0" bit is represented by the absence of a pulse. (The pulses are of alternating polarity, so that the time-averaged voltage of the signal is equal to the level of a "0" bit.)

When a T1 signal is received, the receiver must extract the correct stream of "1" and "0" bits from the incoming analog signal. To do this, the receiver must not only be able to correctly interpret the incoming voltage levels, but must also be able to sample the incoming signal at the correct instantaneous times. The T1 format guarantees that the average data frequency will be 1.544 MHz, but the receiver must also be able to "fine-tune" itself to the actual data frequency of the incoming signal. Moreover, it is not enough to sample the incoming signal with the correct frequency: the receiver must also be able to follow the phase of the incoming signal. For example, if the incoming signal is sampled on a pulse edge, the receiver could mistake a "1" bit for a "0" bit.

Thus, a T1 receiver must be able to recover a correct clock signal from the incoming synchronous data signal. However, this presents further difficulties. The incoming data stream may include random small shifts in the apparent delay between successive symbols. Since the clock must be recovered from the data, this can lead to significant phase modulation of the clock. This undesirable phase modulation of the clock is known as jitter. This jitter can become quite large in T1 communications systems, since a T1 span may include several repeater stations which are typically based on a LC tank circuit. Typically the jitter may be magnitude- and frequency-dependent.

A well known technique to filter out this jitter is to write the jittered data into a small FIFO, using the coherent recovered clock (which includes jitter), and read the data back out using a stable reference clock. (The reference clock is phase locked to the write clock, but filters out the jitter.) Such a "rubber band" use of a FIFO is sometimes referred to as an elastic store.

The present invention provides an improved communications receiver for formats where the clock must be recovered from the data. The amount of jitter present in the data is measured by using the read clock as a reference to sample the FIFO address pointers. This provides a measurement of instantaneous jitter magnitude. The improved measurement of jitter magnitude permits slight frequency offsets to be detected and tracked. This measurement can also be used, in subsequent processing stages, for such purposes as analysis of data errors, checking a data source for loss of T1 compatibility, or adaptive monitoring of channel characteristics.

FIG. 2A shows a conventional jitter-measuring system. A first-in-first-out memory ("FIFO") clocks in a received data stream 202 at times determined by a write clock (WCLK) 204. Every time a pulse occurs on the write clock line 204, the current data on the data-in line 202 is stored in the memory location currently indicated by write address pointer 205, and the write address pointer 205 is incremented. The write clock (WCLK) 204 is derived from the data stream 202 (with some lag), and therefore may contain some jitter. (That is, individual ones of the pulses on the write clock line 204 may occur slightly sooner or slightly later than they should.) The read clock 206 similarly controls the timing of the read operations: every time a pulse occurs on the read clock line 206, data is read out from FIFO 200, from the location indicated by the read-address pointer 209. The read-address pointer 209 is then incremented. (Since the read clock 206 can be heavily filtered, using long-time information about the incoming signal, jitter is essentially absent from this clock.) A magnitude comparator 201 subtracts the value of the write-address pointer 205 from the value of the read-address pointer 209, to calculate jitter magnitude 203. If either the write address 205 or the read address 209 reaches its maximum value (determined by the size of the memory space in FIFO 200), it indicates an overflow (or underflow), and moves the read clock frequency to track the write clock until the overflow or underflow condition ceases. Note that the jitter will not be attenuated during the overflow or underflow condition, but data will be preserved. That is, if the write clock WCLK moves too much in relation to the read clock, an overflow or underflow can happen in the FIFO 200. The T1 standard (as defined by AT&T publication 62411, revised October 1985) sets the maximum peak to peak jitter movement at 28 Unit Intervals (UIs); the FIFO 200 will therefore normally have to be at least 28 bits deep.

The long-time average frequency of the write and read clocks 202 and 206 is 1.544 MHz in the T1 mode of operation, or 2.048 MHz in CEPT mode. T1 specifications and requirements are further detailed in AT&T publication, which defines jitter magnitude in terms of Unit Interval (UI), where 1 UI equals 1 clock period (for T1, 648 nsec) of phase slipping. The FIFO 200 can be imagined as a rubber band, which stretches and contracts relating to the reference frequency, to keep the data stream 202 (of data being written) coupled to the data stream 208 (of data being read), even though the two streams are partially asynchronous to each other.

The jitter also has a frequency component. The curve of maximum possible jitter magnitude versus frequency (in accordance with the T1 standard) is shown in FIG. 2B.

In the conventional architecture shown in FIG. 2A, the read clocks 206 and the write clocks 204 both typically have a frequency equal to the average data rate (which is 1.544 MHz for T1, or 2.048 MHz for CEPT). This limits the resolution of jitter reporting to 1 Unit Interval (1 UI). The FIFO could be operated at a multiple of the data rate if desired; this would give better resolution, but would require more memory space for the same maximum magnitude reporting.

The innovative teachings set forth herein permit the jitter magnitude reporting circuit to be simplified greatly. The write-address pointer 205 is sampled when the read-address pointer 209 goes through zero (i.e. reaches address 00000). This provides a jitter estimate (once for every 32 bits of data) which will be accurate to within one Unit Interval over the duration of four timeslots (32 bits, in the preferred embodiment). Moreover, no digital arithmetic circuits are needed, which greatly simplifies the implementation. (By contrast, a conventional circuit would typically use a subtraction circuit for comparator 201.)

This provides the advantage that less frequent sampling can be used. In the T1 standard, sampling every thirty-second bit implies a sampling rate of only 48.25 kHz. (Similarly, in the CEPT standard, sampling every thirty-second bit implies a sampling rate of only 64 kHz.)

This improved jitter estimating capability provides an improved capability for accurately receiving T1 signals (or for receiving signals in other communications formats.) FIG. 1 shows an example of a complete T1 interface, as enabled by one embodiment of the invention.

An example of previous attempts to configure an integrated circuit interface to the T1 line format can be seen in paper FAM21.2 from the 1987 ISSCC. This paper, by Kenneth Stern et al., of Crystal Semiconductor Corp., is entitled "A Monolithic Line Interface Circuit for T1 Terminals", and is hereby incorporated by reference.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment, wherein these innovative teachings are advantageously applied to the particular problems of a T1 interface. However, it should be understood that this embodiment is only one example of the many advantageous uses of the innovative teachings herein. However, there are many other formats in which the innovative teachings set forth herein can also be applied. For example, satellite communications protocols often use synchronous formatting in frames. Another area where the innovative teachings set forth can be applied is in high-speed modem protocols. In general, statements made in the specification of the present application do not necessarily delimit any of the various claimed inventions. Moreover, some statements may apply to some inventive features but not to others.

Figure 1:
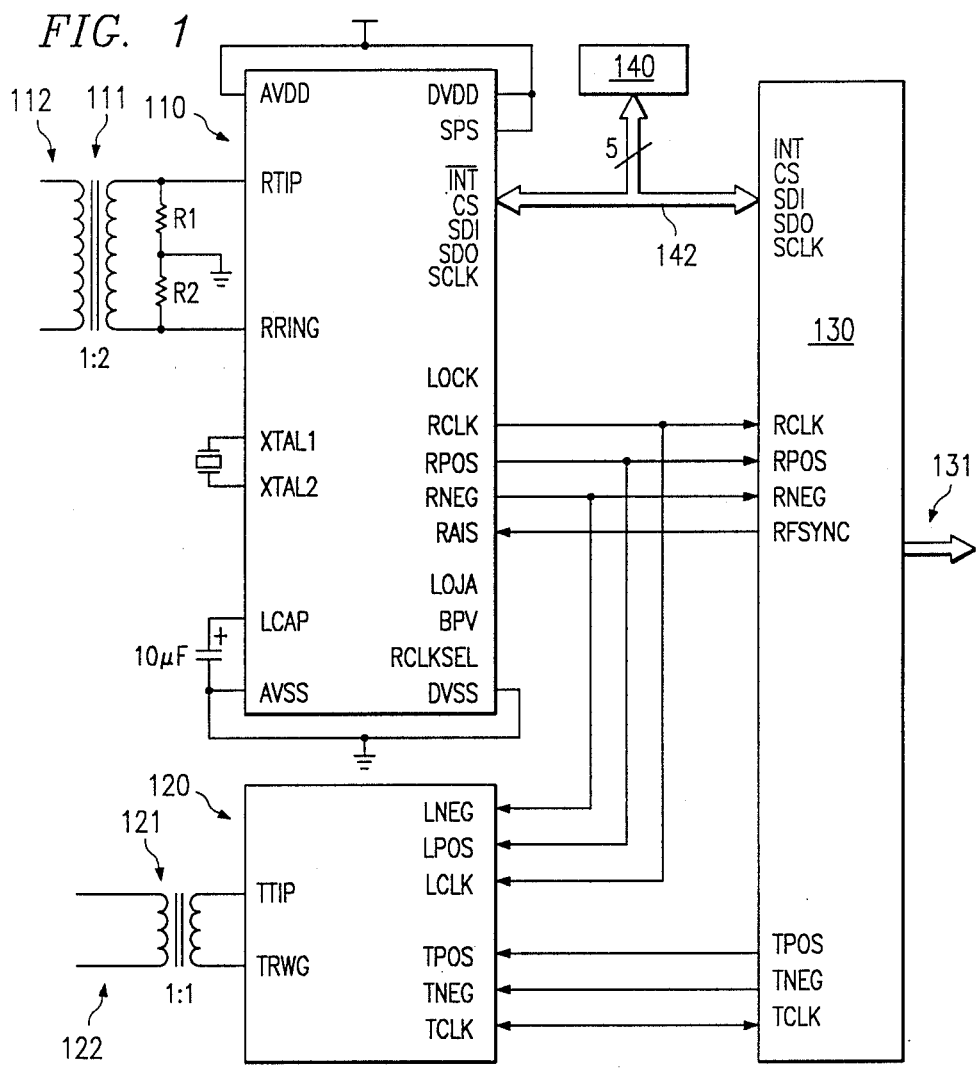
FIG. 1 shows an example of a complete T1 interface, as enabled by one embodiment of the invention.

FIG. 1 shows a complete T1 interface, as enabled by the innovative teachings set forth herein. Pins TTIP and TRING of a transmit line interface 120 are connected through transformer 121 to a twisted pair 122, which sends data out to the telephone company interface. Similarly, pins RTIP and RRING of a receiver line interface chip 110 are connected, through a transformer 111, to another twisted pair 112, which receives data from the telephone company. A crystal 113 is connected to inputs XTAL1 and XTAL2 of the receiver line interface 110, to provide a frequency reference. A data transceiver 130 performs the appropriate data formatting transformations, to interface the serial data interfaces of these two line interfaces 110 and 120 to a system backplane connection 131. (For example, the system backplane may be a VME bus, or conform to another of the many bus architectures available.)

A system controller 140 controls the data transceiver 130 and the receive line interface chip 110. A five-wire serial data bus 142 (including data in, data out, interrupt, clock, and chip select) links the controller chip 140 with the receiver line interface chip 110 and the data transceiver 130. In the presently preferred embodiment, the system controller 140 is a DS5000 nonvolatile microcontroller, but of course, a wide variety of other programmable logic could be used instead.

Figure 4:
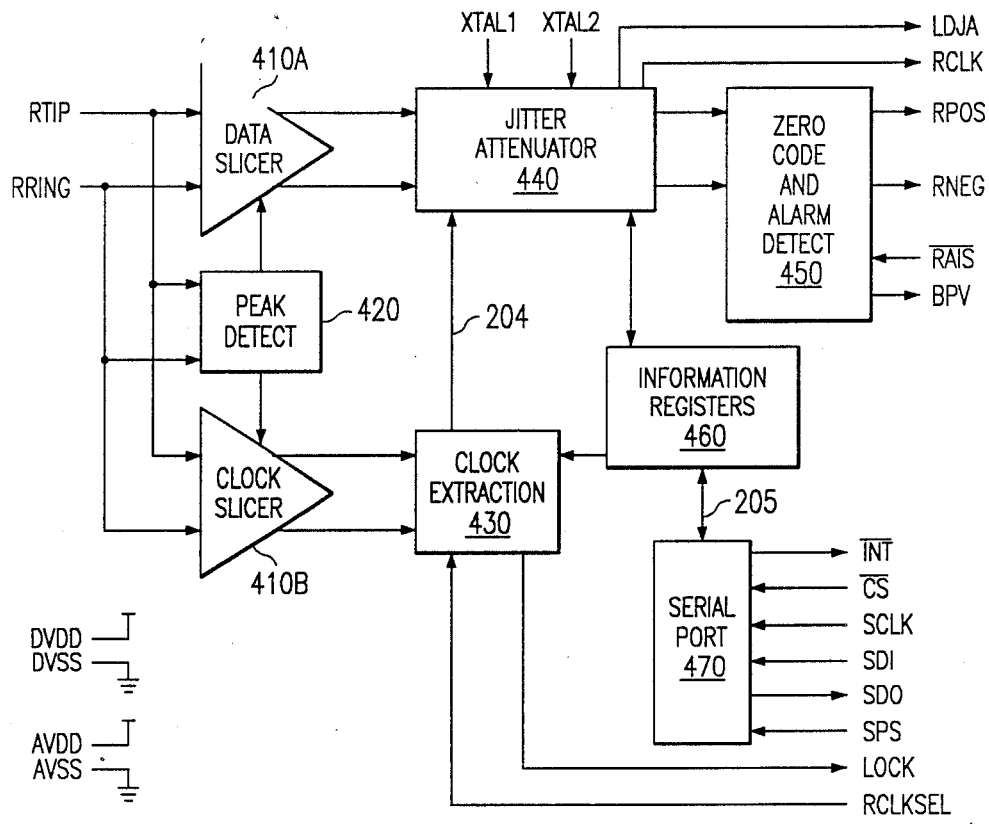
FIG. 4 is a block diagram of the data receiver 110, in the presently preferred embodiment.

FIG. 4 shows the organization of the receiver line interface 110, in the presently preferred embodiment. The analog differential input signal pair RTIP and RRING are connected to two sampling stages, a data slicer 410A and a clock slicer 410B. A peak detector 420 also receives the input signals, and generates a reference voltage for properly converting a signal into digital clock and data waveforms by means of slicers 410A and 410B. (The peak detector 420 is used because the incoming waveform can be anywhere between 2.4 V and 3.6 V peak, and can be attenuated by up to 1000 feet of twisted-pair line.)

The outputs of the clock slicer 410B are fed into a clock recovery circuit 430. Clock-recovery circuits 430 phase-lock onto the incoming data stream 202 to derive a write clock (WCLK) 204. The write clock (WCLK) signal 204 controls writing of data from the data slicer 410A into the FIFO 200. This signal is generated, in conventional fashion, by a phase-locked loop which tracks the characteristics of the incoming data stream.

The inversions of the AMI format are removed from the clock by the clock extraction block 430. However, this information is carried forward in the RPOS and RNEG signals.

Figure 6:
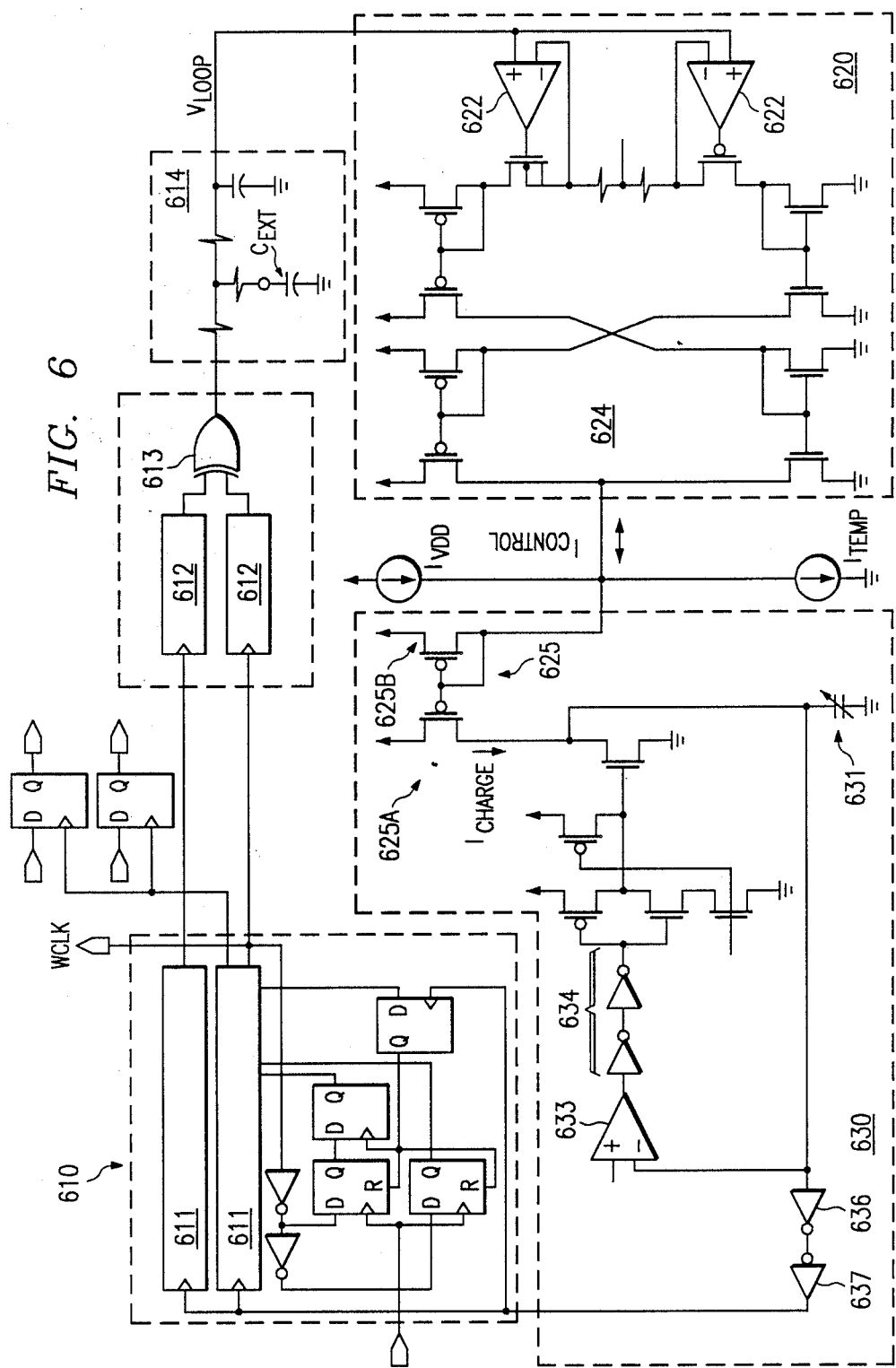
FIG. 6 shows the circuitry which is used, in the presently preferred embodiment, to generate the write clock signal WCLK.

FIG. 6 shows the circuitry which is used, in the presently preferred embodiment, to generate the write clock signal WCLK. This circuitry implements a digital-/analog phase-locked loop (PLL), as follows.

An analog phase-locked loop is used to maintain a master clock signal MCLK at the appropriate frequency. In addition, a digital phase-locked loop, nested within the analog phase locked loop, controls a variable-ratio divider block, and can change the integer by which the master clock signal is divided down. The digital PLL circuit, by providing rapid frequency jumps of about 8%, helps to provide rapid tracking of phase jitter.

A signal LINE_CLK is received from a peak detector which triggers on instantaneous peak levels in the incoming analog signal (received on line 122). This signal is provided as input to a digital phase-locked loop 610. The digital PLL 610 provides increment or decrement commands to variable divider 611. The master high frequency clock signal MCLK is fed in parallel to two divider blocks, 611 and 611'. Divider block 611 is a variable-ratio divider, which divides the master clock signal by an amount which can be varied under control of the digital phase-locked loop control logic 610. The divider block 611', by contrast, is simply a constant-ratio divider block. In the presently preferred embodiment, divider block 611 can divide the master clock signal by eleven, by twelve, or by thirteen, depending on the control inputs it receives. The constant divider block 611' simply divides the master clock signal MCLK by twelve.

The output of the variable-ratio divider block 611 provides the write clock signal WCLK, which is used as described above. In addition, the output of this block is also used to gate the sampling of the incoming data stream. The constant-ratio divider block 611' provides a signal FLLCLK, which will be fed forward to control the circuitry which generates the master high-frequency clock MCLK.

Both the WCLK and FLLCLK are now further divided down, in two parallel divider blocks 612. (In the presently preferred embodiment, these divider blocks 612 implement a divide-by-128 function.) An XOR gate 613 combines the outputs of these two blocks. The XOR operation produces an output signal which will be high only at moments when the two inputs are not in the same logic state. Therefore, this output signal can be used as an error signal to indicate the degree of phase mismatch between these two signals. RCLK and FLLCLK are 90° out of phase when the system is in lock, thus providing a 50% duty cycle through the XOR gate.

The output of this XOR gate is filtered by a loop filter block 614 (preferably including a large external capacitor $C_{EXT}$), to generate an error signal $V_{LOOP}$.

This signal is then fed back to an oscillator control block 620. This control block includes back-to-back comparators 622, which provide control voltages to the upper and lower sides of a CMOS current source 624. (Greater detail regarding the advantages and features of this block may be found in commonly owned U.S. patent application No. 198,613, filed 5/24/88 (2846-26), which is hereby incorporated by reference.)

The current source 624 provides a control current $I_{CONTROL}$. This control current is combined with two other currents $I_{VDD}$ (which is dependent substantially only on the power supply voltage) and $I_{TEMP}$ (which provides some temperature compensation). The resultant current, reflected in a current mirror with gain, provides the charging current $I_{CHARGE}$. (Note that $I_{CHARGE}$ will be equal to a multiple of the signed sum of the control current $I_{VDD}$, $I_{TEMP}$, and $I_{CONTROL}$. The multiplier will be approximately equal to the ratio of the channel widths of the two transistors 625A and 625B.)

The charging current $I_{CHARGE}$ which is passed by transistor 625A defines the half-cycle of oscillator 630. The charging current $I_{CHARGE}$ is integrated in capacitor 631, until the voltage in this capacitor becomes equal to the reference voltage of $V_{REF}$. When comparator 633 detects that the capacitor 631 has charged up to $V_{REF}$, its output goes low. This transition is buffered by gates 634, to turn on the large n-channel transistor 632. This rapidly pulls the voltage on capacitor 631 back down to the ground voltage $V_{SS}$, which restarts the timing cycle. Inverter 636, which has an input connected to capacitor 631, preferably switches at an input voltage which is less than $V_{REF}$ (and greater than half of $V_{REF}$). Thus, the sawtooth voltage waveform seen at the input to inverter 636 will be translated into a roughly symmetrical digital waveform. In the presently preferred embodiment, capacitor 631 is laser trimmable, to provide a signal frequency, at the input to inverter 636, which is approximately equal to twelve times the desired base frequency (which in the presently preferred embodiment is equal to twelve times 1.544 MHz, or 18.528 kHz). The time for the discharge cycle of the oscillator 630 will be approximately equal to $$T_{DISCHARGE} = \frac{C_{631} V_{REF}}{I_{CHARGE}}.$$

The output of inverters 636 and 637 provides the master clock signal MCLK referred to above.

Figure 5:
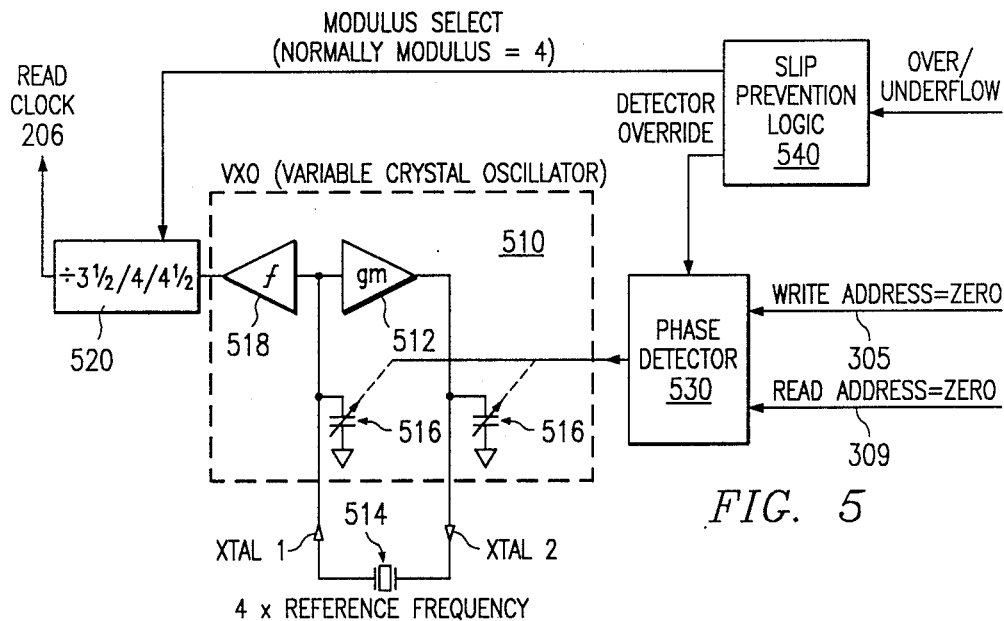
FIG. 5 shows the circuitry used, in the presently preferred embodiment, to generate the read clock signal RCLK.

FIG. 5 shows the circuitry used, in the presently preferred embodiment, to generate the read clock. A crystal oscillator 510, including an amplifier 512 and an external crystal 514 which is connected to the two leads XTAL1 and XTAL2 referred to above, sustains oscillation. In the presently preferred embodiment, the crystal 514 is selected to oscillate at approximately four times the reference frequency. (In the presently preferred embodiment, this is four times 1.544 MHz, or 6.176 MHz.) A pair of trimming capacitors 516 are connected in parallel with the crystal 514. As is well known to those skilled in the art, although the crystal 516 has an extremely high Q (typically of the order of 10,000 or higher), the frequency of this circuit can be pulled slightly by additional reactance in the circuit. Thus, the trimming capacitors 516 can pull the frequency of the oscillator 510 by up to 200 parts per million. The analog signal developed by the oscillator 510 is thresholded in a comparator 518, and the digital output of this comparator is provided to a variable divider block 520.

Phase detector logic 530 receives signals 305 (indicating that the write address is passing through 0) and 309 (indicating that the read address is passing through 0). In accordance with the timing offset between these signals, the phase detector 530 will control the variable trim capacitors 516, to pull the frequency of the oscillator 510 to minimize the offset.

In addition, slip prevention logic 540 receives an input to indicate when an overflow or underflow event is imminent in the FIFO. In this case, the slip prevention logic 540 will provide a control signal to the variable divider 520, to shift the divide ratio performed by this provider from 4 to 4.5 or 3.5. This means that the frequency of the read clock 206 at the output will suddenly shift by about 12%. Thus, this sudden frequency shift provides a way to suddenly change the frequency of the read clock. When this occurs, the slip prevention logic 540 also provides an override signal to the phase detector 540, to make certain that the phase detector 530 is in the proper state.

The read clock 206 is also phase-locked to the incoming data stream, but is more highly filtered. The high-Q resonant crystal, which is preferably connected to pins XTAL1 and XTAL2, provides a reference for the read clock's loop. The frequency of the crystal can be pulled somewhat (by the reactive load seen by the crystal), but only by a small percentage. Thus, the read clock is generated by a circuit which in effect contains a very high-Q resonant filter in its feedback path. The read clock controls the timing of the read operations: every time a pulse occurs on the read clock line 206, data is read out from FIFO 200, from the location indicated by the read-address pointer 209, and the read-address pointer 209 is then incremented. (Since the read clock 206 can be heavily filtered, using long-time information about the incoming signal, jitter is essentially absent from this clock.) A wide variety of conventional techniques can be used to filter the incoming data to provide the read clock 206. See, for example, F. Gardner, Phaselock Techniques (2.ed 1979) (which is hereby incorporated by reference). Further details regarding the organization and operation of conventional clock recovery circuits may be found in the Stern et al. paper referenced above, or in Shih et al., "Jitter Attenuation Phase Locked Loop Using Switched Capacitor Controlled Crystal Oscillator," paper number 9.5 from the 1988 IEEE Custom Integrated Circuits Conference (which is hereby incorporated by reference).

The read clock 206 is further stabilized by the resonant crystal attached to pins XTAL1 and XTAL2.

Figure 2A:
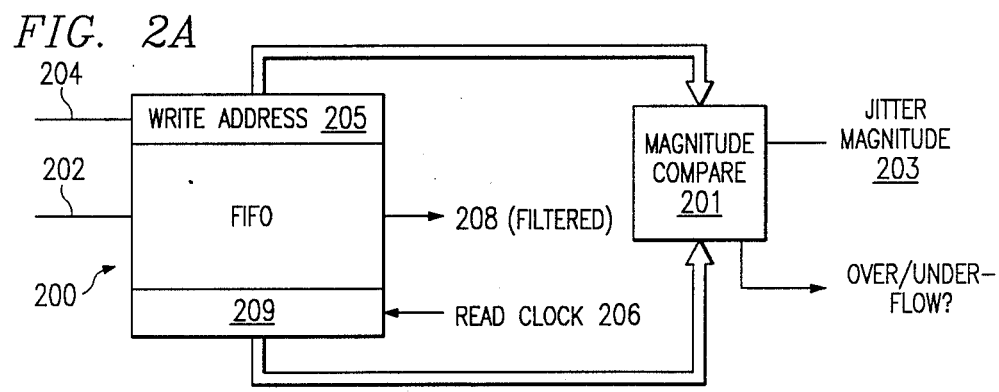
FIG. 2A shows a conventional jitter-measuring system.

FIG. 2A shows the FIFO memory 200 which is a part of the jitter attenuating circuit 440. (The presently preferred embodiment uses a FIFO memory 200, as shown in FIG. 2A, but does not use the magnitude comparator 201 which is also shown in FIG. 2A.) A first-in-first-out memory ("FIFO") 200 clocks in a received data stream 202 at times determined by a write clock (WCLK) 204. Every time a pulse occurs on the write clock line 204, the current data on the data-in line 202 is stored in the memory location currently indicated by write address pointer 205, and the write address pointer 205 is incremented. The write clock 204 is derived from the data stream 202 (with some lag), and therefore may contain some jitter.

In the presently preferred embodiment, the FIFO 200 is actually two bits wide (and 32 bits deep). The two data channels through the FIFO are used to preserve the AMI format. This allows error checking downstream (for example, by the transceiver 130).

Figure 3:
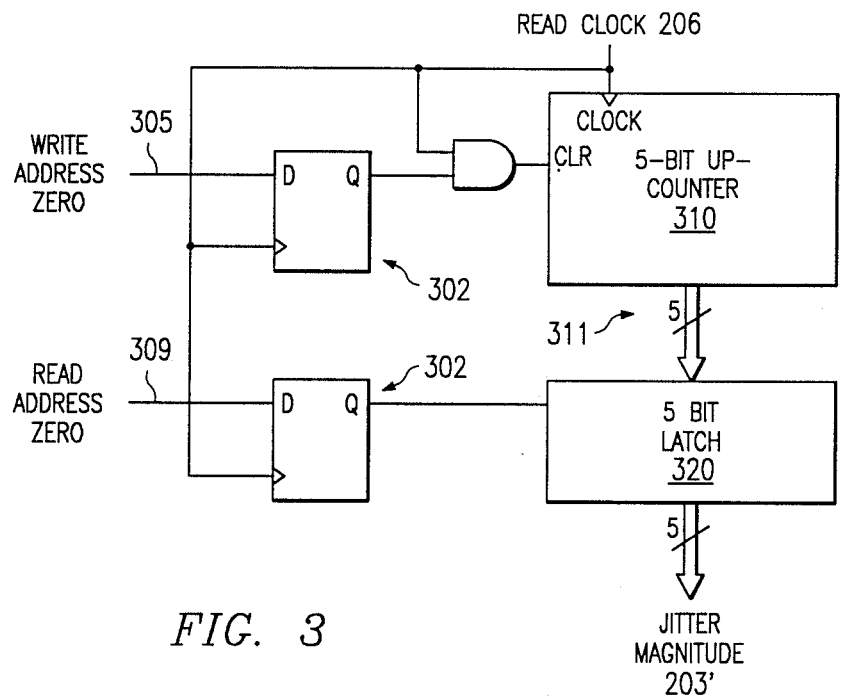
FIG. 3 shows an innovative organization for improved measurement of jitter characteristics of an unclocked synchronous signal.

An important part of the jitter attenuator circuit 440 is shown in FIG. 3. This circuit provides greatly improved jitter reporting. The write-address pointer 205 is sampled when the read-address pointer 209 goes through zero (i.e. reaches address 00000). (The use of address 00000 is arbitrary, and is selected for convenience. Alternatively, a different address could be used instead.) This provides a jitter estimate 203 once for every 32 bits of data. The jitter estimate 203 will be accurate to within one Unit Interval, and will be updated every 32 bits of data. Moreover, no digital arithmetic circuits are needed, which greatly simplifies the implementation.

An up counter 310 (which, if the FIFO 200 is only 32 bits deep, only needs to have 5 bits of resolution) is connected to be clocked by the read clock 206. (Thus, each pulse of the read clock 206 causes the counter 310 to increment its outputs 311 by 1.) A one-bit logical signal 305 indicates whenever the write address 205 is exactly equal to zero, and the counter 310 is also connected to be reset (cleared) whenever the write address 205 crosses zero. (A one-bit logical signal 305, registered by a flip-flop 302, indicates whenever the write address 205 is exactly equal to zero. Similarly, a one-bit logical signal 309, also registered by a flip-flop 302, indicates whenever the read address 209 is exactly equal to zero.) If either the write address 205 or the read address 209 reaches its maximum value (determined by the size of the memory space in FIFO 200), it simply returns to zero (or to its minimum value.) When read address 0 occurs, the value of the counter's current value 311 is latched by latch 320, and then becomes available (at the chip's serial port) as the jitter estimate 203. The instantaneous jitter estimate 203 provides a value corresponding to the distance between pointer locations of the FIFO.

The jitter estimate 203 is provided as an input to one of the Information Registers 460 (shown in FIG. 4). From the Register 460, the jitter estimate 203 (with other data) can be accessed though serial port 470 (which interfaces to the bus 142 shown in FIG. 1). Thus, the control processor 140 can monitor the jitter estimates and ascertain the quality of the received signal.

In the presently preferred embodiment, the read address will pass through zero at a frequency of 1.544 MHz/32 bits=48.25 KHz. This means that new jitter data will be available this often. This data can be Fourier-transformed, if desired, to provide accurate information about the spectral characteristics of jitter up to about 24 kHz.

Figure 2B:
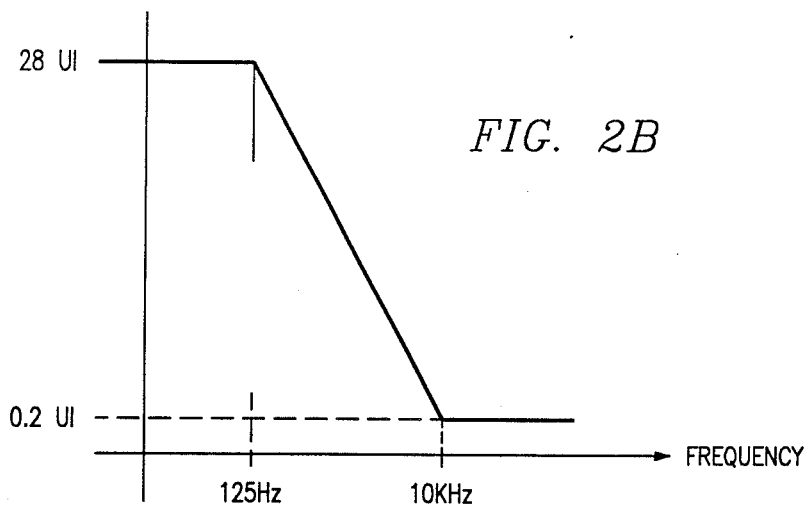
FIG. 2B shows the curve of maximum possible jitter magnitude versus frequency (in accordance with the T1 standard).

FIG. 2B shows a jitter roll-off curve for T1 transmission. Note that the jitter magnitude specification drops to less than 1 UI (which, in the presently preferred embodiment, is the limit of resolution) at about two or three kiloHertz. Thus, since jitter is primarily a low-frequency phenomenon, 24 kHz is sufficient bandwidth to report any significant jitter magnitude.

Some of the operational features of the receiver line interface chip 110, as configured in the presently preferred embodiment, will now be described in detail. Of course, it should be understood that this specific embodiment is merely illustrative, and that the preferred features can be embodied in a wide variety of contexts.

Some of the advantages of this preferred embodiment include:

Interface for both T1 (1.544 MHz) and CEPT (2.048 MHz) standards;
Extraction of clock and data from twisted pair or coax;
More than 28 UI of jitter tolerance at 10 Hz;
Unique instantaneous jitter reporting through the serial port;
Decodes AMI, B8ZS, and HDB3 signals;
Simple serial interface port used for configuration and to report alarms and error events; and
"Hardware" mode requires no host processor but still allows access to most features.

This embodiment of the receiver line interface chip 110 is suitable for both T1 and CEPT applications, and meets the requirements of PUB 62411, TR170, and CCITT G.823. It is designed to operate on short loop applications, such as DSX-1. The device extracts clock and data from twisted pair or coax, and it will attenuate the jitter of the of the incoming signal. This embodiment of the receiver line interface chip 110 is compatible with the DS2180A and DS2181 data transceivers. Application areas include DACS, CSU, CPE, channel banks, and PABX to computer interfaces, such as DMI and CPI.

Peak Detectors and Slicers: Signals present at RTIP and RRING are sampled by an internal peak detect circuit. The data slicer threshold is set for 50% of the sampled peak voltage. The clock slicer is set higher (at 70%) to prevent the negative undershoot of a worse case DSX-1 pulse from causing erroneous clocking.

Peak input levels at RTIP and RRING must exceed 0.1 volts peak to establish minimum slicer thresholds. Signals below this level will cause the RCL bit in the Receive Status Register (RSR) to be set after 192 bit times.

Clock Extraction: The receiver line interface chip 110 utilizes both frequency locked (FLL) and digital phase locked (DPLL) loops to recover clock and data from the incoming signal. The DPLL characteristics differ for T1 and CEPT modes. T1 applications utilize a 18.528 MHz clock divided by either 11, 12, or 13 to match the phase of the incoming jittered line signal. A 16.384 MHz clock divided by 7, 8, or 9 provides jitter tracking in the CEPT mode. An on-chip laser trimmed voltage controlled oscillator (VCO) provides the precision 18.528 MHz and 16.384 MHz frequency sources utilized in the DPLL. The FLL is a high-Q circuit which tracks the average frequency of the incoming signal. Once the FLL has achieved frequency lock and valid data is present at the RPOS and RNEG outputs, the LOCK pin will go high and the OOL bit in the Receive Status Register (RSR.0) will be cleared. During the acquisition time or if carrier loss occurs (RSR.3=1), the LOCK pin will go low and RSR.0 will be set.

Jitter Attenuation: The DPLL output from the clock extraction circuitry is fed to a 32×2 bit FIFO where is serves as the write pointer for the sliced positive and negative data. The read pointer of the FIFO is derived from the crystal oscillator connected to a XTAL1 and XTAL2. As long as the jitter present at RTIP and RRING is less than 30 unit intervals peak to peak ($UI_{pp}$), then the FIFO buffer will be able to absorb the incoming jitter and it will be attenuated according to FIG. A5 in PUB 62411 (October 1985). In this situation, the LOJA pin will remain low and the LOJA bit in the Receive Status register (RSR.4) will be cleared.

If the incoming jitter has excursions greater than 30 $UI_{pp}$, then the crystal oscillator is adjusted to track the frequency of the incoming clock so that there is never any loss of data. When the incoming jitter is greater than 30 $UI_{pp}$, the LOJA alarm will be set (the LOJA pin and the LOJA bit in the RSR will go high). When the incoming jitter returns to under 30 $UI_{pp}$, the LOJA alarm will be cleared.

TABLE 1

Pin Description

| PIN | SYMBOL | TYPE | DESCRIPTION |
|---|---|---|---|
| 1 | AVDD | — | Analog Positive Supply 5.0 Volts. |
| 2 | RAIS | I | Reset Alarm Indication Signal. Every other failing edge at this input establishes the AIS alarm detection period. |
| 4 | LCAP | — | Loop Cap. Part of internal loop filter; attach a 10 microF capacitor from this pin to VSS. |
| 5 | RCLKSEL | I | Receive Clock Select. Tie to VSS for 1.544 MHz (T1) applications, to VDD for 2.048 MHz(CEPT) applications. |
| 6 | RTIP | I | Receive Tip and Ring. Connect to line transformer. |
| 7 | RRING | I | |
| 8 | LOJA | O | Loss of Jitter Attenuation. High state indicates that the jitter of the incoming signal at RTIP and RRING is greater than 30 $UI_{pp}$. |
| 9 | XTAL1 | I | Crystal Connections. |
| 10 | XTAL2 | O | |
| 12 | AVSS | — | Analog Signal Ground. 0.0 Volts. |
| 13 | DVSS | — | Digital Signal Ground. 0.0 Volts. |
| 16 | LOCK | O | Frequency Lock: High state indicates that internal circuitry is phase and frequency locked to the incoming signal at RTIP and RRING. |
| 17 | WCLK | O | Receive Clock (write clock) extracted from the crystal oscillator or the received signal. |
| 18 | RNEG | O | Receive Data. Extracted receive data, |
| 19 | RPOS | | updated on rising edge of WCLK. |
| 20 | NC | — | No Connect. Do not connect to this pin. |
| 21 | BPV | O | Bipolar Violation. Transitions high for a full pit period when a bit in violation appears at RPOS or RNEG. B8ZS or HDB3 code words are not accused when zero code suppression is enabled. (RCR.3 = 1). |
| 24 | DVDD | — | Digital Positive Supply 5.0 Volts. |

TABLE 2

Port Pin Description

| PIN | SYMBOL | TYPE | DESCRIPTION |
|---|---|---|---|
| 15 | INT* | O | Receive Alarm Interrupt. Flags host controller during alarm conditions. Active low, open drain output. |
| 22 | SDI | I | Serial Data In. Data for on-board registers. Sampled on rising edge of SCLK. |
| 23 | SDO | O | Serial Data Out. Control and status information from on-board registers. Updated on falling edge of SCLK, tristated during serial port write or when CSI is high. |
| 14 | CS* | I | Chip Select. Must be low to read or write the serial port. |

TABLE 2-continued

| PIN | SYMBOL | Port Pin Description TYPE | DESCRIPTION |
|---|---|---|---|
| 3 | SCLK | I | serial Data Clock. Used to read or write the read port registers. |
| 11 | SPS | I | Serial Port Select. Tie to VDD to select serial port. Tie to VSS to select hardware mode. |

Note: The port pins are multifunctional.

TABLE 3

| REGISTER | ADDRESS | Register Summary DESCRIPTION/FUNCTION |
|---|---|---|
| RSR | 10000 | Receive Status Register. Reports all alarm conditions. |
| RIMR | 10001 | Receive Interrupt Mask Register. Allows masking of individual alarm generated interrupts. |
| RCR | 10010 | Receive Control Register. Programs device operating characteristics. |
| RJRR | 10011 | Receive Jitter Reporting Register. Reports jitter level of incoming signal. |

Serial Port Interface: The port pins of the receiver line interface chip 110 serve as a microprocessor/microcontroller compatible serial port. Four on-board registers allow the user to update operational characteristics and monitor device status via a host controller, minimizing hardware interfaces. The ports ont he receiver line interface chip 110 can be read or written to at any time.

Address Command: Reading or writing the control, configuration or status registers requires writing one address/command byte prior to transferring register data. The first bit written (LSB) of the address/command word specifies register read or write. The following 5 bits identify the register address. The next bit is reserved and must be set to zero for proper operation. The last bit of the address/command word enables burst mode when set; the burst mode causes all registers to be consecutively read or written to. Data is read and written to the receiver line interface chip 110 LSB first.

Chip Select and Clock Control: All data transfers are initiated by driving the CS* input low. Input data is latched on the rising edge of SCLK and must be valid during the previous low period of SCLK to prevent momentary corruption of register data during writes. Data output ont he falling edge of SCLK and held to the next falling edge. All data transfers are terminated if the CS* input transitions high. Port control logic is disabled and SDO is tristated when CS* is high.

Data I/O: Following the 8 SCLK cycles that input an address/command byte to write, a data byte is strobed into the address register on the rising edge of the next 8 SCLK cycles. Following an address/command word to read, contents of the selected register are output on the falling edges of the next 8 SCLK cycles. The SDO pin is tristated during device write and may be tied to SDI in applications where the host processor has a bidirectional I/O pin.

Burst Mode: The burst mode allows all on-board registers to be consecutively written to or read by the host processor. A burst read is used to poll all registers; RSR contents will be unaffected. This feature minimizes device initialization time on system power-up or reset. Burst mode is initiated when ACB.7 is set and the address is 10000. Burst is terminated by a low-high transition on CS*.

TABLE 4

ACB: Address Command Byte (MSB) (LSB)
BM — ADD4 ADD3 ADD2 ADD1 ADD0 R/W*

| SYMBOL | POSITION | NAME AND DESCRIPTION |
|---|---|---|
| BM | ACB.7 | Burst Mode. If set (and register address is 10000), burst read or write is enabled. |
| — | ACB.6 | Reserved, must be 0- for proper operation. |
| ADD4 | ACB.5 | MSB of the register address |
| ADD0 | ACB.1 | LSB of register address |
| R/W* | ACB.0 | Read/Write Select: 0 = write addressed register; 1 = read addressed register |

TABLE 5

RSR: Receive Status Register (MSB) (LSB)
— — — LOJA RCL AIS BPV OOL

| SYMBOL | POSITION | NAME AND DESCRIPTION |
|---|---|---|
| — | RSR.7 | Not defined, could be any value when read |
| — | RSR.6 | Not defined, could be any value when read |
| — | RSR.5 | Not defined, could be any value when read |
| LOJA | RSR.4 | Loss of Jitter Attenuation. Set when greater than 30 $UI_{pp}$ of jitter is received on RTIP and RRING. |
| RCL | RSR.3 | Receive Carrier Loss. Set when 192 consecutive "zeros" appear at RTIP and RRING. |

TABLE 5-continued

| | | RSR: Receive Status Register |
|---|---|---|
| (MSB) | | (LSB) |
| — — — LOJA RCL AIS BPV OOL | | |
| SYMBOL | POSITION | NAME AND DESCRIPTION |
| AIS | RSR.2 | Alarm Indication Signal. Set when the received data stream has less than three "zeros" during the last two periods of the RAIS signal. |
| BPV | RSR.1 | Bipolar Violation. Set when a bit in violation appears at RPOS or RNEG. B8ZS and HDB3 code words are not accused when zero code suppression is enabled (RCR.3 = 1). |
| OOL | RSR.0 | Out of Lock. Set when the circuitry is not locked in frequency or phase to the incoming signal at RTIP and RRING. |

The receive status register (RSR) can be used in either a "polled" or an "interrupt" configuration. In a polled configuration, the user reads the RSR at regular intervals to check for alarms. In an interrupt configuration, the user monitors the INT* pin. When the INT* pin goes low, an alarm condition has occurred and has been reported in the RSR. The processor can then read the RSR to find which bits have been set. All of the bits in the RSR operate in a "latched" fashion. That is, once set, they will remain set until read. The bits in the RSR are cleared when read unless the read was performed in the burst mode. Once cleared, the bits will be set again if the alarm persists.

Alarm Indication Signal: The receiver line interface chip 110 considers that is has received and Alarm Indication Signal (AIS) when less than three "zeros" have appeared at RPOS and RNEG during the last two periods of the RAIS signal. The receiver line interface chip 110 will remain in AIS alarm for at least the next two periods of RAIS and the alarm will be considered cleared when more than two "zeros" appear.

Receive Carrier Loss: The receiver line interface chip 110 considers that is has lost the incoming signal if it receives 192 consecutive "zeros" and it will set the Receive Carrier Loss (RCL) alarm. This alarm will be cleared on the next "ones" occurrence.

TABLE 6

| | | RMR: Receive Interrupt Mask Register |
|---|---|---|
| (MSB) | | (LSB) |
| — — — LOJA RCL AIS BPV OOL | | |
| SYMBOL | POSITION | NAME AND DESCRIPTION |
| — | RIMR.7 | Reserved, must be 0 for proper operation. |
| — | RIMR.6 | Reserved, must be 0 for proper operation. |
| — | RIMR.5 | Reserved, must be 0 for proper operation. |
| LOJA | RIMR.4 | Loss of Jitter Attenuation Mask: 1 = interrupt enabled; 0 = interrupt masked |
| RCL | RIMR.3 | Receive Carrier Loss Mask: 1 = interrupt enabled; 0 = interrupt masked. |
| AIS | RIMR.2 | Alarm Indication Signal Mask: 1 = interrupt enabled; 0 = interrupt masked |
| BPV | RIMR.1 | Bipolar Violation Mask: 1 = interrupt enabled; 0 = interrupt masked |
| OOL | RIMR.0 | Out of Lock Mask: 1 = interrupt enabled; 0 = interrupt masked |

The Receive Interrupt Mask Register (RIMR) is used to mask alarms from being indicated on the INT* pin; alarms are still reported in the RSR. Clearing appropriate bits in the RIMR will unconditionally clear an interrupt.

TABLE 7

| | | RCR: Receive Control Register |
|---|---|---|
| (MSB) | | (LSB) |
| — — — — ZCSEN RST DJA RCS | | |
| SYMBOL | POSITION | NAME AND DESCRIPTION |
| — | RCR.7 | Reserved, must be 0 for proper operation. |
| — | RCR.6 | Reserved, must be 0 for proper operation. |
| — | RCR.5 | Reserved, must be 0 for proper operation. |
| ZCSEN | RCR.4 | Zero Code Suppression Enable. When set, B8ZS (RCR.0 = 0) or HDB3 (RCR.0 = 1)code words are replaced with all zeros at RPOS and RNEG. When clear, no replacement occurs. |
| RST | RCR.2 | Reset. When taken from 0 to 1, clears all registers, realigns the buffer, and causes the clock extraction circuit to relock onto the incoming signal. |
| DJA | RCR.1 | Disable Jitter Attenuation. When set, the jitter attenuator is bypassed and jitter present at RTIP and RRING is passed to WCLK, RPOS, and RNEG. |
| RCS | RCR.0 | Receive Clock Select: 1 = 2.048 MHz(CEPT) applications; 0 = 1.544 MHz (T1 applications). |

Reset: The reset bit in the Receive Control Register (RCR.2) is "positive edge" triggered. That is, in order for a reset to be initiated, RCR.2 must be taken from a 0 to a 1. If a reset is issued to the receiver line interface chip 110, all four registers are cleared, the FIFO buffer will be realigned to maximum depth, and the clock extraction circuit will relock onto the incoming signal. While the receiver line interface chip 110 is relocking onto the incoming signal, the Out of Lock (OOL) bit in the RSR (RSR.0) will be set and the LOCK pin will be low.

TABLE 8

RJRR: Receive Jitter Reporting Register (MSB)                                    (LSB)
— — — RJRR4 RJRR3 RJRR2 RJRR1 RJRR0

| SYMBOL | POSITION | NAME AND DESCRIPTION |
|---|---|---|
| — | RJRR.7 | Not defined, could be any value when read. |
| — | RJRR.6 | Not defined, could be any value when read. |
| — | RJRR.5 | Not defined, could be any value when read. |
| RJRR4 | RJRR.4 | MSB of the jitter magnitude. |
| RJRR0 | RJRR.0 | LSB of the jitter magnitude. |

The Receive Jitter Reporting Register (RJRR) displays an instantaneous reading of the amplitude of the jitter on the signal received at RTIP and RRING. The reading is derived from the relative positions of the read and write pointers in the FIFO buffer. By reading the RJRR at numerous intervals, the user can calculate the excursions of the jitter on the received signal.

Hardware Mode: For preliminary system prototyping or applications which do not require the features offered by the serial port, the receiver line interface chip 110 can be reconfigured by the SPS pin. Tying SPS to VSS disables the serial port and redefines pins 3, 14, 15, 22, and 23 as control and alarm pins. The hardware mode allows device retrofit into existing applications where mode control and alarm conditioning hardware is often designed with discrete logic.

TABLE 9

Hardware Mode Pin Definition

| PIN # | I/O | REGISTER | NAME AND DESCRIPTION |
|---|---|---|---|
| 3 | I | RCR.3 | Zero Code Suppression Enable. 1 = enable; 0 = disable |
| 14 | I | RCR.2 | Reset. Active low, a transition from high to low will initiate a reset. |
| 15 | I | RCR.1 | Disable Jitter Attenuation. 1 = disable jitter attenuation; 0 = enable jitter attenuation |
| 22 | O | RCR.2 | Alarm Indication Signal. 1 = alarm present; 0 = alarm absent |
| 23 | O | RCR.3 | Receive Carrier Loss. 1 = alarm present; 0 = alarm absent. |

Line Input: Input signals are coupled to the receiver line interface chip 110 via a 1.2:1 center-tapped transformer as shown in FIG. 8. For T1 applications, R1 and R2 must be 200 ohms in order to properly terminate the line at 100 ohms. R1 and R2 are set at 150 or 240 ohms for CEPT applications. Special circuitry at the RTIP and RRING inputs permit negative signal excursions below VCC, which will occur in the circuit in FIG. 8.

Bypassing and Layout Considerations: The receiver line interface chip 110 contains both precision analog and high speed digital circuitry on the same chip. The power supplies of the circuits (AVDD, AVSS, DVDD and DVSS) should be connected to system analog and digital supplies. If separate supplies do not exist, the appropriate supply pins may be tied together. The analog supply should be bypassed with 1 microF and 0.01 microF capacitors; if a separate digital supply exists, bypass it with an additional 0.1 microF capacitor.

To assure optimum performance, the length of LCAP, RTIP, and RRING printed circuit board traces should be minimized and isolated from neighboring interconnect.

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, a FIFO deeper than 32 bits could be used if desired. In this case, less frequent jitter estimates could be used, or the comparison could be changed so that jitter was reported more once during a single cycle through the FIFO.

The counting operations can also be changed. For example, a down-counter could readily be substituted for the up-counter 310 of the presently preferred embodiment.

The use of the read and write addresses can also be interchanged. In this alternative, the zero-crossings of the write address would be used to control sampling of the read address. (In this case, it might be particularly preferable to run the counter as a down-counter.)

Moreover, the write clock, rather than the read clock, could alternatively be used to clock the counter.

Moreover, in place of the simple latch 320 used in the presently preferred embodiment, a wide variety of other circuits can optionally be used.

Figure 7:
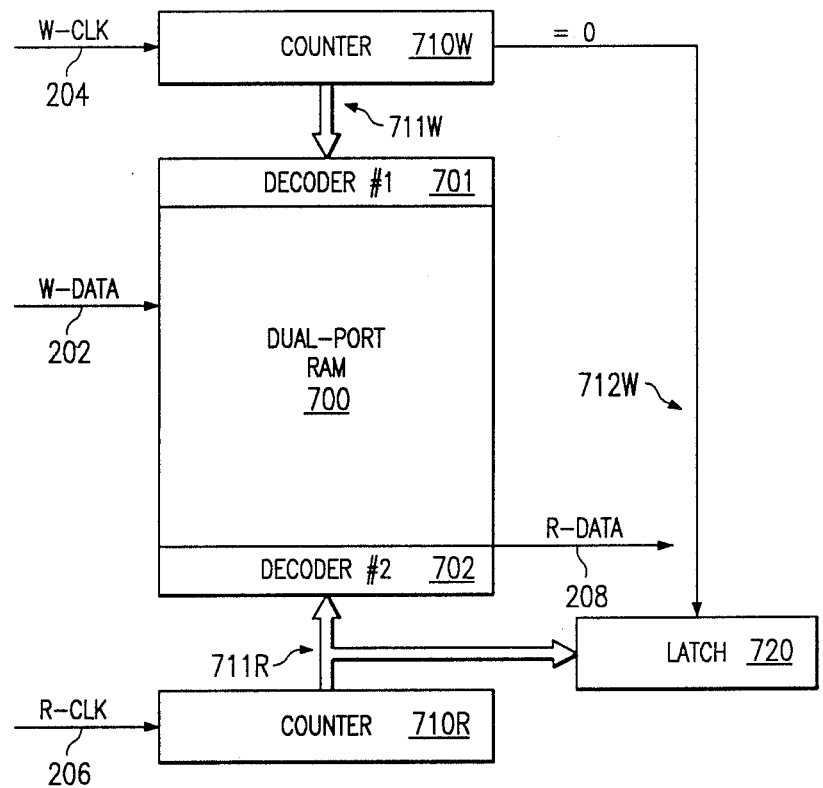
FIG. 7 shows a sample alternative embodiment.

A further sample embodiment is shown in FIG. 7. The FIFO 200 is shown as a dual-port RAM array 700, together with two address decoders 701 and 702. The write-clock 206 clocks a write-address counter 710W, and the read-clock 204 clocks a read-address counter 710R. The count value output 711W of the write-address counter 710W is connected to the first address decoder 701, and the count value output 711R of the read-address counter 710R is connected to the second address decoder 702. A latch 720 receives the count value 711R from the read-address counter 710R, and also receives a COUNT=ZERO output 712 from counter 710W. Thus, when the counter 710W reaches zero, latch 712 will output the current count value 711R, which is also the current read address value. Thus, this arrangement too will serve to read out the value of the read address when the write address crosses a predetermined value. Note that the counters 710W and 710R can be ring counters, with sizes equal to the address space of the memory array 700 (or, less preferably, integer multiples or fractions thereof). It is also possible to make further changes in this embodiment (e.g. interchanging the read and write address connections), as noted above.

Many of the advantages of the present invention have been discussed in the specific context of T1 and CEPT standards. These two standards are extremely widely used, and improvements in the use of these standards are of immense importance. However, there are many other formats in which the innovative teachings set forth herein can also be applied. For example, satellite communications protocols often use synchronous formatting in frames. Another area where the innovative teachings set forth can be applied is in high-speed modem protocols.

As will be recognized by those skilled in the art, the innovative concepts described in the present application can be modified and varied over a tremendous range of applications, and accordingly their scope is not limited except by the allowed claims.

What is claimed is:

1. A communications receiver, for receiving incoming synchronous data streams, comprising:
   a first clock recovery circuit, which generates a first estimated clock signal from the incoming data stream;
   a second clock recovery circuit, which generates a second estimated clock signal from the incoming data stream, said second estimated clock signal being more highly filtered than said first estimated clock signal and having substantially the same average frequency as said first estimated clock signal;
   a first-in-first-out memory, configured to operate such that incoming data is written, at times governed by said first clock signal, into an address location specified by a write-address-pointer value, and data is read out, at times governed by said second clock signal, from an address location specified by a read-address-pointer value;
   and a jitter estimating circuit, comprising
      a counter, clocked by one of said estimated clock signals, and having a reset input, and
      a latch device which latches the outputs of said counter whenever a predetermined one, of said read-address-pointer value and said write-address-pointer value, crosses a predetermined value,
      wherein said reset input of said counter is connected to be reset whenever the one of said read-address-pointer value and said write-address-pointer value which is not said predetermined one crosses said predetermined value,
      and wherein the output of said memory device provides an estimate of jitter.

2. The receiver of claim 1, wherein said first-in-first-out memory comprises an array of memory cells, and wherein addresses in said array require at least five bits of data.

3. The receiver of claim 1, wherein said first-in-first-out memory is thirty-two bits deep.

4. The receiver of claim 1, wherein said first-in-first-out memory is at least thirty-two bits deep, and wherein said counter is connected to be reset whenever the least significant bits of said write-address-point are equal to said predetermined value.

5. The receiver of claim 1, wherein said counter is connected to be reset whenever said write-address-pointer value crosses zero.

6. The receiver of claim 1, wherein said second clock recovery circuit is stabilized by a crystal resonator.

7. The receiver of claim 1, wherein said first-in-first-out memory carries exactly two bits of data in parallel.

8. The receiver of claim 1, wherein said first-in-first-out memory carries at least two bits of data in parallel at each said address thereof.

9. The receiver of claim 1, wherein said estimate of jitter is fed back to control said second clock recovery circuit.

10. The receiver of claim 1, wherein said predetermined value of said write-address-pointer at which said counter is reset is the same as said predetermined value of said read-address-pointer at which said counter output is latched.

11. The receiver of claim 1, wherein said memory device is a latch.

12. The receiver of claim 1, wherein said counter is an up-counter.

13. The receiver of claim 1, wherein said counter is a down-counter.

14. The receiver of claim 1, wherein said counter is clocked by said second estimated clock signal.

15. The receiver of claim 1, wherein said memory device latches the outputs of said counter whenever said read-address-pointer value crosses said predetermined value.

16. The receiver of claim 1, wherein said counter is connected to be reset whenever said write-address-pointer value crosses said predetermined value.

17. A communications receiver, for receiving incoming synchronous data streams, comprising:
   a first clock recovery circuit, which generates a first estimated clock signal from the incoming data stream;
   a second clock recovery circuit, which generates a second estimated clock signal from the incoming data stream, said second estimated clock signal being more highly filtered than said first estimated clock signal and having substantially the same average frequency as said first estimated clock signal;
   a serial-access memory, configured to operate such that
      successive bits of the incoming data are written, with a timing governed by said first estimated clock signal, into address locations specified by the current value of a write-address-pointer which is incremented at each said write operation, and
      successive bits are read out, with a timing governed by said second clock signal, from an address location specified by the current value of a read-address-pointer which is incremented at each said read operation;
   and a counter,
      clocked by said second estimated clock signal, and having a reset input which is connected to reset whenever said write-address-pointer value crosses a predetermined value, and
      having an output which is connected, through a latch circuit, to be latched whenever said read-address-pointer value crosses a predetermined value, the successive latched outputs of said counter providing an estimate of jitter.

18. The receiver of claim 17, wherein said serial-access memory comprises an array of memory cells.

19. The receiver of claim 17, wherein said serial-access memory is thirty-two bits deep.

20. The receiver of claim 17, wherein said counter is connected to be reset whenever said write-address-pointer value crosses zero.

21. The receiver of claim 17, wherein said second clock recovery circuit is stabilized by a crystal resonator.

22. The receiver of claim 17, wherein said serial-access memory carries at least two bits of data in parallel at each said address thereof.

23. The receiver of claim 17, wherein said estimate of jitter is fed back to control said second clock recovery circuit.

24. The receiver of claim 17, wherein said predetermined value of said write-address-pointer at which said counter is reset is the same as said predetermined value of said read-address-pointer at which said counter output is latched.

25. The receiver of claim 17, wherein said counter is an up-counter.

26. A communications receiver, for receiving incoming synchronous data streams, comprising:
a clock recovery circuit, which generates a recovered clock signal from the incoming data stream;
an elastic store memory, configured to write successive bits of the incoming data, with a timing governed by said recovered clock signal, into address locations specified by the current value of a write-address-pointer which is incremented at each said write operation, and to read out successive bits, with a timing governed by a reference clock signal, from address locations specified by the current value of a read-address-pointer which is incremented at each said read operation; and
a counter, clocked by a second estimated clock signal which is more highly filtered than said recovered clock signal, and having a reset input which is connected to reset said counter whenever a predetermined one, of said read-address-pointer value and said write-address-pointer value, crosses a predetermined value, and having an output which is connected, through a latch circuit, to be latched whenever the one of said read-address-pointer value and said write-address-pointer value which is not said predetermined one crosses a predetermined value; the successive latched outputs of said counter providing an estimate of jitter.

27. The receiver of claim 26, wherein said counter is an up-counter.

28. The receiver of claim 26, wherein said elastic store memory comprises an array of memory cells.

29. The receiver of claim 26, wherein said counter is clocked by said reference clock signal.

30. The receiver of claim 26, wherein said elastic store memory is thirty-two bits deep.

31. The receiver of claim 26, wherein said elastic store memory is at least thirty-two bits deep, and wherein said counter is connected to be reset whenever the least significant bits of said write-address-point are equal to said predetermined value.

32. The receiver of claim 26, wherein said counter is connected to be reset whenever said write-address-pointer value crosses zero.

33. The receiver of claim 26, wherein said elastic store memory carries at least two bits of data in parallel at each said address thereof.

34. The receiver of claim 26, wherein said predetermined value of said write-address-pointer at which said counter is reset is the same as said predetermined value of said read-address-pointer at which said counter output is latched.

35. A communications receiver, for receiving incoming synchronous data streams, comprising:
a clock recovery circuit, which generates a recovered clock signal from the incoming data stream;
an elastic store memory, configured to write successive bits of the incoming data, with a timing governed by said recovered clock signal, into address locations specified by the current value of a write-address-pointer which is incremented at each said write operation, and to read out successive bits, with a timing governed by a reference clock signal, from address locations specified by the current value of a read-address-pointer which is incremented at each said read operation; and
a jitter-estimating circuit, which outputs a jitter estimate corresponding to the instantaneous value of a first one of said write-address- and read-address-pointers, whenever a second one of said write-address-and read-address-pointers equals a predetermined value.

36. The receiver of claim 35, wherein said jitter estimate is equal to the instantaneous value of said first one of said write-address- and read-address-pointers.

37. The receiver of claim 35, wherein said jitter-estimating circuit outputs a jitter estimate corresponding to the instantaneous value of said read-address pointer, whenever said write-address pointer equals said predetermined value.

38. The receiver of claim 35, wherein said predetermined value is zero.

39. A method for measuring jitter in an incoming synchronous data stream, comprising the steps of:
buffering the incoming data stream in an elastic store memory, using a write-address-pointer which indicates the current write location therein and a read-address-pointer which indicates the current read location therein;
reading data out of said elastic store memory with a timing governed by a reference clock;
reading data out of said elastic store memory with a timing governed by a reference clock;
providing a counter which is clocked by said reference clock;
resetting said counter whenever said write-address-pointer value crosses a predetermined value; and
outputting the value of said counter whenever said read-address-pointer value crosses a predetermined value.

40. The method of claim 39, wherein said counter is clocked by said reference clock signal.

41. The method of claim 39, wherein said elastic store memory is thirty-two bits deep.

42. The method of claim 39, wherein said counter is connected to be reset whenever said write-address-pointer value crosses zero.

43. The method of claim 39, wherein said predetermined value of said write-address-pointer at which said counter is reset is the same as said predetermined value of said read-address-pointer at which said counter output is latched.

44. The method of claim 39, wherein said counter is an up-counter.

45. A method for receiving an incoming synchronous data stream, comprising the steps of:

connecting the incoming data stream to a clock recovery circuit, which generates a recovered clock signal therefrom;

writing successive bits of the incoming data into an elastic store memory, with a timing governed by said recovered clock signal, at address locations specified by the current value of a write-address-pointer; and incrementing said write-address-pointer at each said write operation;

and, concurrently with said writing operation, reading out successive bits from said elastic store memory, with a timing governed by a reference clock signal, from address locations which are specified by the current value of a read-address-pointer; and incrementing said read-address-pointer at each said read operation; and estimating jitter in the incoming data stream, by latching and outputting a count value whenever said read-address-pointer value crosses a predetermined value, and resetting said count value whenever said write-address-pointer value crosses a predetermined value.

46. The method of claim 45, wherein increments in said count value counter are clocked by said reference clock signal.

47. The method of claim 45, wherein said elastic store memory is thirty-two bits deep.

48. The method of claim 45, wherein said count value is connected to be reset whenever said write-address-pointer value crosses zero.

49. The method of claim 45, wherein said predetermined value of said write-address-pointer at which said count value is reset is the same as said predetermined value of said read-address-pointer at which said count value is latched.

* * * * *